US008542874B2

(12) United States Patent
Hoeflinger

(10) Patent No.: US 8,542,874 B2
(45) Date of Patent: Sep. 24, 2013

(54) VIDEOTRACKING

(75) Inventor: Florian Hoeflinger, Munich (DE)

(73) Assignee: Cairos Technologies AG (DE)

( * ) Notice: Subject to any disclaimer, the term of this patent is extended or adjusted under 35 U.S.C. 154(b) by 518 days.

(21) Appl. No.: 12/668,650

(22) PCT Filed: Dec. 18, 2007

(86) PCT No.: PCT/EP2007/011128
§ 371 (c)(1),
(2), (4) Date: Jun. 30, 2010

(87) PCT Pub. No.: WO2009/006931
PCT Pub. Date: Jan. 15, 2009

(65) Prior Publication Data
US 2010/0278386 A1 Nov. 4, 2010

Related U.S. Application Data

(60) Provisional application No. 60/949,075, filed on Jul. 11, 2007.

(30) Foreign Application Priority Data

Jul. 11, 2007 (DE) .......................... 10 2007 032 259

(51) Int. Cl.
*G06K 9/00* (2006.01)
(52) U.S. Cl.
USPC .......................................... 382/103; 348/169
(58) Field of Classification Search
USPC .......................................... 382/103; 348/169
See application file for complete search history.

(56) References Cited

U.S. PATENT DOCUMENTS

| 6,738,631 | B1 * | 5/2004 | Adler et al. ................ 455/456.6 |
| 6,757,428 | B1 * | 6/2004 | Lin et al. ........................ 382/165 |
| 6,950,123 | B2 * | 9/2005 | Martins ........................ 348/157 |
| 7,110,569 | B2 * | 9/2006 | Brodsky et al. ............... 382/103 |
| 7,149,325 | B2 * | 12/2006 | Pavlidis et al. .............. 382/103 |
| 7,230,221 | B2 * | 6/2007 | Busse et al. ................ 250/203.6 |
| 7,336,807 | B2 * | 2/2008 | Tabata .......................... 382/118 |
| 7,426,301 | B2 * | 9/2008 | Porikli ........................ 382/181 |
| 7,899,208 | B2 * | 3/2011 | Kondo et al. ................. 382/103 |
| 8,144,207 | B2 * | 3/2012 | Abe .......................... 348/222.1 |
| 8,249,378 | B2 * | 8/2012 | Ono .............................. 382/255 |
| 8,355,532 | B2 * | 1/2013 | Gillard et al. ................. 382/103 |
| 2002/0126876 | A1 * | 9/2002 | Paul et al. ..................... 382/104 |
| 2003/0044045 | A1 * | 3/2003 | Schoepflin et al. ........... 382/103 |
| 2003/0086596 | A1 * | 5/2003 | Hipp et al. .................... 382/128 |

(Continued)

OTHER PUBLICATIONS

Tracking multiple sports players—Chris J. Needham and Roger D. Boyle, 2001.*

(Continued)

*Primary Examiner* — Jayesh A Patel
*Assistant Examiner* — Iman K Kholdebarin
(74) *Attorney, Agent, or Firm* — Workman Nydegger

(57) ABSTRACT

A method for tracking an object in a sequence of video frames includes the following steps: creating a model with characteristic features for the object to be tracked; and performing a template matching algorithm in individual frames on the basis of the created model for determining a position of the object in the respective frame. An apparatus arrangement for performing the method includes at least one video camera (10, 12), at least one monitor (24, 26), one computer (20) and one input device (28) for an observer (22).

23 Claims, 2 Drawing Sheets

(56) References Cited

U.S. PATENT DOCUMENTS

| | | | |
|---|---|---|---|
| 2003/0150907 A1* | 8/2003 | Metcalf et al. | 235/375 |
| 2003/0177503 A1* | 9/2003 | Sull et al. | 725/112 |
| 2003/0178487 A1* | 9/2003 | Rogers | 235/454 |
| 2004/0170318 A1* | 9/2004 | Crandall et al. | 382/165 |
| 2005/0151841 A1* | 7/2005 | Nelson et al. | 348/82 |
| 2005/0207617 A1* | 9/2005 | Sarnoff | 382/103 |
| 2005/0265581 A1* | 12/2005 | Porter et al. | 382/103 |
| 2005/0265603 A1* | 12/2005 | Porter et al. | 382/190 |
| 2005/0288911 A1* | 12/2005 | Porikli | 703/2 |
| 2006/0045312 A1* | 3/2006 | Bernstein et al. | 382/103 |
| 2006/0093188 A1* | 5/2006 | Blake et al. | 382/103 |
| 2006/0140445 A1* | 6/2006 | Cusack | 382/103 |
| 2006/0280335 A1* | 12/2006 | Tomita et al. | 382/103 |
| 2007/0041612 A1* | 2/2007 | Perron et al. | 382/103 |
| 2007/0116328 A1* | 5/2007 | Sablak et al. | 382/103 |
| 2007/0237359 A1* | 10/2007 | Sun | 382/103 |
| 2008/0193020 A1* | 8/2008 | Sibiryakov et al. | 382/209 |
| 2008/0273752 A1* | 11/2008 | Zhu et al. | 382/103 |
| 2009/0028440 A1* | 1/2009 | Elangovan et al. | 382/216 |
| 2009/0161185 A1* | 6/2009 | Hashizume | 358/518 |
| 2009/0175497 A1* | 7/2009 | Anai et al. | 382/103 |
| 2009/0180669 A1* | 7/2009 | Horovitz et al. | 382/103 |
| 2009/0232358 A1* | 9/2009 | Cross | 382/103 |
| 2009/0238408 A1* | 9/2009 | Ikeda et al. | 382/103 |
| 2009/0262977 A1* | 10/2009 | Huang et al. | 382/103 |
| 2009/0296989 A1* | 12/2009 | Ramesh et al. | 382/103 |
| 2009/0311265 A1* | 12/2009 | Van Den Brink et al. | 424/142.1 |
| 2010/0007758 A1* | 1/2010 | Abe et al. | 348/222.1 |
| 2010/0027843 A1* | 2/2010 | Wilson | 382/103 |
| 2010/0092036 A1* | 4/2010 | Das et al. | 382/103 |
| 2010/0142805 A1* | 6/2010 | Maxwell et al. | 382/164 |
| 2010/0165113 A1* | 7/2010 | Abe | 348/169 |
| 2010/0195870 A1* | 8/2010 | Ai et al. | 382/103 |
| 2010/0278386 A1* | 11/2010 | Hoeflinger | 382/103 |
| 2011/0148875 A1* | 6/2011 | Kim et al. | 345/420 |
| 2011/0243381 A1* | 10/2011 | Tsagkatakis et al. | 382/103 |
| 2011/0268320 A1* | 11/2011 | Huang et al. | 382/103 |
| 2011/0311100 A1* | 12/2011 | Fan | 382/103 |

OTHER PUBLICATIONS

Analysis and presentation of soccer highlights, Yow et al. 1995.*
Robust Image mosaicing of Soccer Videos, Kim, 2000.*
Tracking Soccer players based on Homography among multiple views, Iwase, 2003.*
Analysis and presentation of soccer highlights, Yow et all 1995.*
Region based analysis and retrival for tracking of semantic objects, andrade, 2005.*
Robust image mosaicing of soccer videos, kim 2000.*
Tracking soccer players based on homography among multiple views, Iwase,Proceedings of SPIE vol. 5150 (2003).*
Gavrila, , "The Visual Analysis of Human Movement: A Survey", Computer Vision and Image Understanding; vol. 73, No. 1' Jan. 1999, 82-98.
Iwase, et al., "Tracking Soccer Players Based on Homography Among Multiple Views", XP002471886' Dept. of Information and Computer Science, Keio Univ.' Yokohama, Japan, 283-290, For line : Iwase,Proceedings of SPIE vol. 5150, (2003).
Lu, et al., "Generic Object Registration Using Multiple Hypotheses Testing in Partition Trees", Knowledge-Based Digital Media Processing; XP005025517; IEEE Pro-Vis Image Signal Process. vol. 153, No. 3, Jun. 6; Dept. of Electronics Systems Engineering, Univ. of Essex, UK, 323-330, For line C, IEEE Proc Vis/ Image Signal Proc. vol. 153, Jun. 2006.
Luiz-Andrade, Ernesto , "Region-Based Analysis and Retrieval for Tracking of Semantic Objects and Provision of Augmented Information in Interactive Sport Scenes", IEEE Transactions on Multimedia, vol. 7, No. 6; Dec. 2005; Essex, UK, 1084-1096.
Needham, et al., "Tracking Multiple Sports Players Through Occlusion, Congestion and Scale", XP002471887; School of Computing, Leeds, UK; 2001, 93-102.
Reid, , "An Algorithm for Tracking Multiple Targets", XPOO9110568; IEEE Transactions on Automatic Control, vol. AC-24, No. 6; Dec. 1979; Palo Alto, CA, 843-854.

* cited by examiner

VIDEOTRACKING

CROSS-REFERENCE TO RELATED APPLICATIONS

This application is a national phase entry of PCT Patent Application No. PCT/EP2007/011128, filed 18 Dec. 2007, which claims priority to German Patent Application No. 10 2007 032 259.5, filed 11 Jul. 2007 and U.S. Provisional Patent Application No. 60/949,075, filed 11 Jul. 2007, each of which is incorporated herein by reference.

BACKGROUND OF THE INVENTION

1. Technical Field

The invention relates to a method for tracking an object in a sequence of video frames. The invention further relates to an apparatus arrangement for performing the method.

2. Description of the Related Art

Video tracking methods typically are utilized for tracking the movement of objects recorded in images, in order to supply the obtained data to an evaluation. Objects generally can be persons, articles or the like. In the field of sports, for instance, the movements of players or athletes can be detected digitally by means of video tracking and be evaluated for statistical purposes.

From US 2003/0179294 A1, a video tracking method is known, in which a multitude of cameras is used. The recognition of objects always is based on a background subtraction, for which purpose a dual median filter is used, and on a subsequent blob analysis. However, because of the complex filtering and the multitude of logical operations due to the complete examination of each frame, the known method is so ineffective that it is not suitable for real-time processing.

A further video tracking method is described in U.S. Pat. No. 5,363,297 A on the example of the tracking of players during a football (soccer) match. This method is also based on the principle of background subtraction. The used algorithms only allow error-free tracking as long as the player to be tracked is freely visible. Otherwise, if there is any uncertainty, an immediate intervention of a match observer is absolutely necessary.

SUMMARY OF THE INVENTION

The problem to be solved by the invention is to avoid the disadvantages of the known methods and to provide a video tracking method for continuously tracking an object which can be performed with a limited calculation effort in order to be suitable for real-time processing, and which requires as little manual intervention by an observer as possible.

To solve the above problem, the invention provides a method for tracking an object in a sequence of video frames with the following steps: creating a model with characteristic features for the object to be tracked; and performing a template matching algorithm in individual frames on the basis of the created model for determining a position of the object in the respective frame.

The invention is based on the finding that a template matching algorithm on the basis of a suitable virtual model (template) usually provides very reliable results, but requires distinctly less computing power as compared to conventional methods based on background subtraction.

The invention also creates an apparatus arrangement for performing the method according to the invention, comprising at least one video camera, at least one monitor, one computer and one input device for an observer.

Advantageous and expedient aspects of the method and apparatus arrangement according to the invention are indicated in the sub-claims.

Further features and advantages of the invention will become apparent from the following description of a preferred embodiment and from the accompanying drawings, to which reference is made.

DETAILED DESCRIPTION OF THE INVENTION

The invention will be explained in detail on the example of a football (soccer) match, in which primarily the movement of the individual players, possibly also of other objects, is to be tracked.

Figure 1:
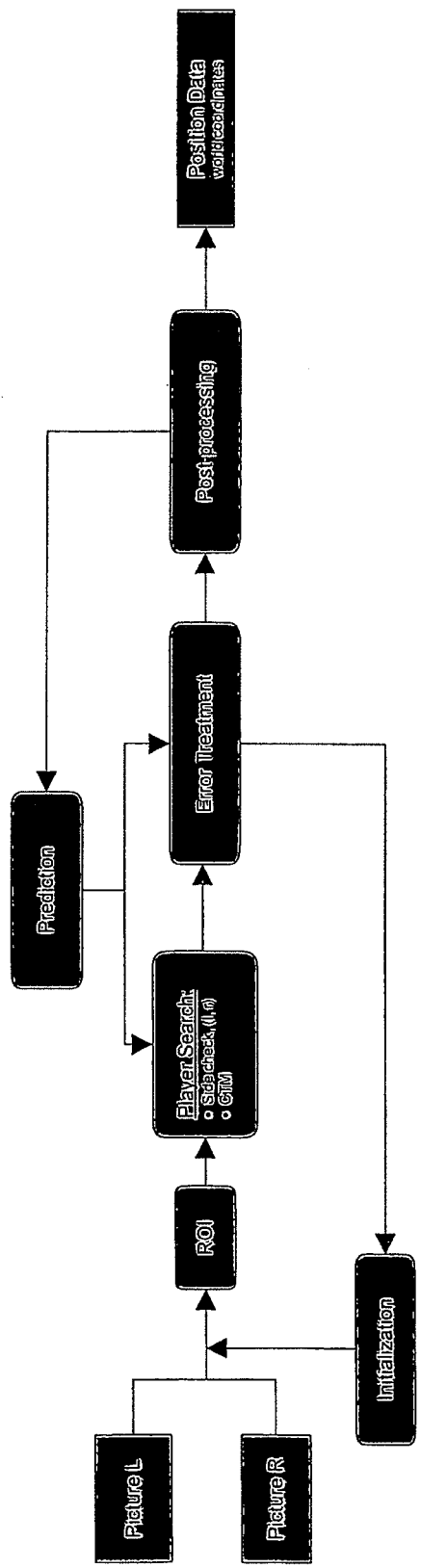
FIG. 1 shows a block diagram of a method of the invention in accordance with a preferred embodiment.
Figure 2:
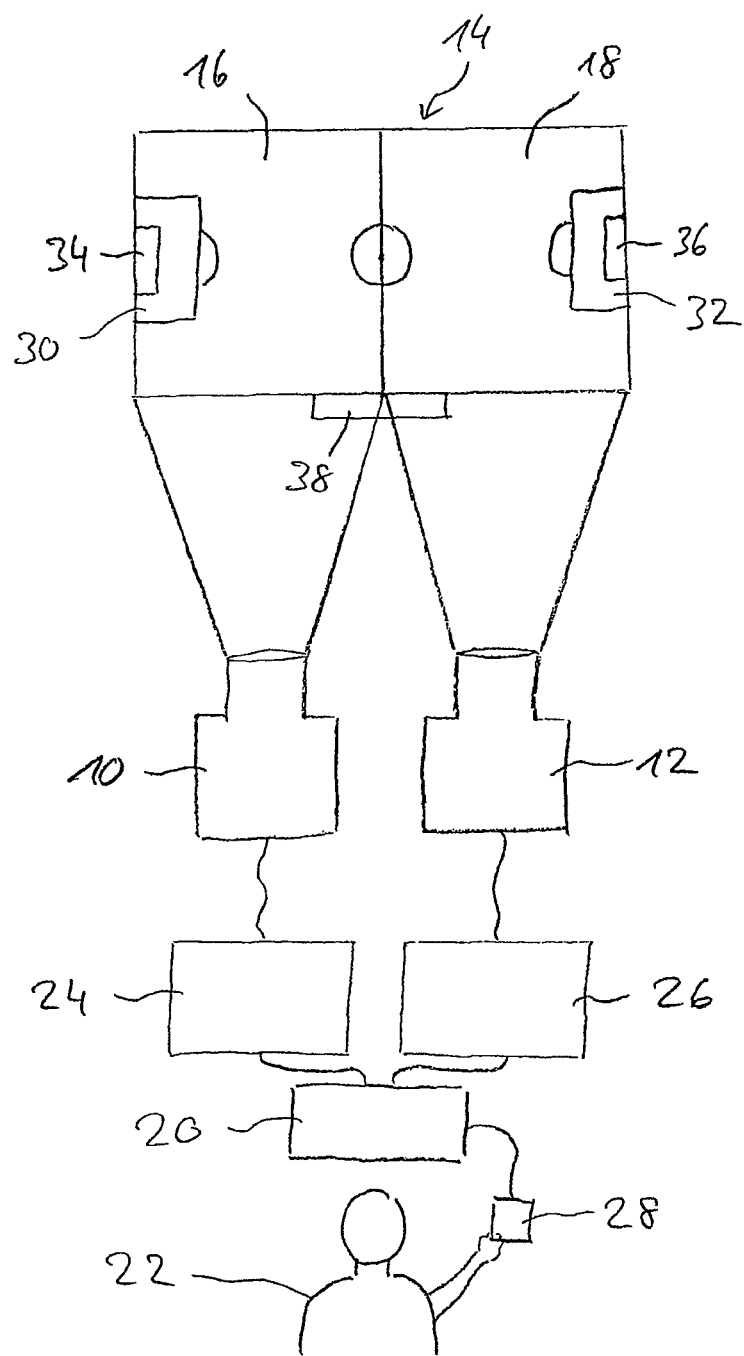
FIG. 2 shows components of an apparatus arrangement of the invention for performing the method of FIG. 1.

In accordance with the preferred embodiment of the invention shown in FIGS. 1 and 2, two video cameras 10, 12 are positioned at a suitable, elevated position and are directed towards a football (soccer) field 14 (football pitch). The first camera 10 covers the entire left half 16 and the second camera 12 covers the entire right half 18 of the field 14, without a major overlap. The cameras 10, 12 need not be stationary, but can also be movable. In the latter case, the relative position of the respective camera 10, 12 with respect to a reference point must be measured or estimated and be considered correspondingly when evaluating the recorded material.

The cameras 10, 12 are connected with a computer 20, which evaluates the images (sequence of individual video frames) recorded by the cameras 10, 12 on a real-time basis. For this purpose, not only one but a plurality of computers can be provided. A match observer 22 can specifically take influence, in particular when detecting an error in the evaluation, as will be explained further below. The match observer 22 has one or more monitors 24, 26 at his disposal, on which the recordings of the cameras 10, 12 are displayed, and an input device 28, by which he can enter any settings and manually intervene in the real-time evaluation.

The location of the computer 20 as well as the location of the monitors 24, 26 and of the match observer 22 generally are independent of the location of the cameras 10, 12, when suitable data transmission means (wire-bound or wireless) are used. With the exception of the cameras 10, 12, the required equipment including the match observer 22 can be accommodated e.g. in a technical studio, from which the evaluated data are communicated to a television station which broadcasts the match as a live event.

The detection range of the two cameras 10, 12 defines a relevant image region, within which the positions of the individual players are to be detected for the entire duration of the match. In the following, this relevant image region is referred to as ROI (region of interest). It is understood that the ROI need not necessarily exactly correspond with the detection range of the cameras 10, 12. In most cases the ROI is manually determined by the match observer 22 within the detection range. In this way, certain regions inside or outside the ROI can be defined in addition (masking process). Those additional regions then can be considered particularly in the evaluation process. Examples for such regions, which can easily be discriminated by means of existing lines on the field 14, are the left and right halves 16, 18, the penalty areas ("18 yard boxes") 30, 32, the goal areas ("six yard boxes") 34, 36, the region outside the field 14 in general, and an (inofficial) player exchange zone 38.

For performing the method of the invention, a different number of cameras can also be provided (only one or more than two). In particular, beside "dividing" the field 14 into two parts, as it is achieved by the two cameras 10, 12 in accordance with the arrangement described above, the playing ground can also be divided into four or eight parts by means of four or eight cameras, respectively, for example.

Before the match starts, virtual models are created for the players to be tracked (possibly also for the referee and the referee's assistants) within the scope of an initialization. On the basis of these models the template matching algorithm will later be performed in the individual frames. In general, such model includes characteristic features, which distinguish the object to be tracked from the background and potentially from other (moving) objects.

In the particular case of a football (soccer) match, a separate model is created for each person or group of persons, whose clothing colors (shirt, shorts, socks) distinguish the same from other persons. Thus, a first model is created for the field players of the one team, a second model for the (differently dressed) goalkeeper of the one team, a third model for the field players of the other team and a fourth model for the goalkeeper of the other team (possibly also a fifth model for the referee and the referee's assistants). For the sake of simplicity, only the tracking of field players will be considered in the following, so that only their models (subsequently referred to as player models) will be described.

The player models substantially are composed of two components: a geometric component and a color component. The geometric component includes at least one geometric dimension, in the particular case the height of a player (human height). Preferably, the geometric component also includes one or more further dimensions, in particular a width, so that a geometric shape (here: a simple rectangle) is defined. The geometric component can be determined in different ways. In the following, three suitable methods are presented:

Background subtraction: After a subtraction of the stationary and largely invariable background, preferably by using a median filter, so-called blobs are left, which represent the players. From the multitude of player sizes, which are determined upon background subtraction, a location-dependent function for height and width is created by means of the "least squares method". This is necessary, because the two cameras 10, 12 only record a two-dimensional image and a player appears the larger, the closer he is to the camera.

Based on a calibration with respect to another object with a known position and known dimensions, and assignment of an exact player size manually or from a database.

Manual annotation by the match observer 22. On one of the monitors 24, 26 a height, possibly also a width, is specified by the observer 22 with the aid of the input device 28.

The color component of the player model relates to the clothing colors of the respective players. In dependence on the previously determined geometric component, object regions are defined, to which specific colors are associated. Assuming that the geometric component is a rectangle, a shirt color is associated to the upper half of the rectangle, a shorts color to the lower quarter adjoining the upper half, and a socks color to the bottommost quarter. The corresponding specifications can be supplied manually by the match observer 22 or automatically from a database. The allocation of colors to the individual regions can of course be effected even more precisely, when the geometric component is defined more discriminately.

In accordance with a further development of the invention, a separate, individual player model can also be created for each individual player, when the exact size (human height) thereof is known. This value then is included in the geometric component of the player model. The individual heights of individual players can be obtained e.g. from a database, in which corresponding player data are stored.

As soon as the player models have been created, the individual players can be tracked. The objective is to track a player from the beginning without interruption, so that a position can be determined for the player at any time. For this purpose, the individual frames recorded by the cameras 10, 12 are evaluated. It is not absolutely necessary to analyze every single frame of the sequence, but the robustness of the method can be increased thereby. When cameras with a very high frame rate are used, however, theoretically frames might regularly be omitted in the analysis, in order to limit the calculation effort.

For determining the position of a certain player, a template matching algorithm is performed for each frame on the basis of the player model created for this player by means of a dynamic prediction. Proceeding from his "history", a forecast is made, in what region of the currently analyzed frame the player must be located. In the following, this limited forecast region is referred to as the search region.

The history of the player is composed of his preceding movement (direction, speed, possibly acceleration), which results from the positions of the player determined so far. For this purpose, a specific number of past frames up to the current frame is considered (right at the start of tracking, the number of frames relevant for the history is naturally limited).

The boundaries of the search region result from how far the player can maximally have moved theoretically in all possible directions proceeding from his last recorded position (maximum reach) in consideration of realistic biological assumptions (in particular a maximum speed and/or acceleration). As long as the player stays in the detection range of one of the two cameras 10, 12, thus e.g. in the left half 16, only the frames of the first camera 10 must be considered for this player. As soon as the prediction predicts a possible change of the player into the other half 18, part of the isochronous frame of the second camera 12 is also included in the search region and evaluated.

The prediction is performed linearly or by using a Kalman filter. The prediction is dynamic, because it is constantly adapted to the respective conditions, in particular to the changing history of the player.

In the search region of the current frame(s), the template matching algorithm then is performed with a manageable limited calculation effort. Figuratively and simply speaking, the player model (template) created for this player is "moved" over the entire search region and compared with the "underlying" portion of the search region pixel by pixel (pixelwise). The comparison includes both components of the player model, i.e. color matches are searched for in the previously defined object regions. For this purpose, the template matching algorithm defines the colors according to a HSV color model, which as compared to other color models is less sensitive to changes in brightness and provides for a better color separation.

When performing the template matching algorithm, a weighting of the object regions also is included. For instance, the socks are applied with a factor of 0.5 relative to the shirts and shorts, as the color comparison in the region of the socks is subject to a greater uncertainty due to the rapid movement of the players' legs.

As a result, the template matching algorithm provides that location of the player model with the best match. As "the position of the player", a previously defined point is stored, which is determined according to the following considerations: The player position to be stored should be the player's intersection with the plane of the field 14. On average, the middle of the lower boundary of the above discussed player model (the "lower middle") comes closest to this intersection. However, to also consider the inclination of the player in a fast sprint, the ultimately stored player position is a point which is shifted horizontally relative to the lower middle in dependence on the current speed of the player. The stored position automatically becomes part of the history of the player for the evaluation of the next frames to be analyzed.

From the sequence of positions thus determined, running paths, speed, acceleration and other data relevant for statistics, such as the presence in certain regions of the field 14, etc., can be determined. Recording the positions preferably is effected for every single player, i.e. in each frame to be evaluated, a template matching algorithm is performed for each player.

As mentioned already, the position of the player model with the best match is searched for in each frame. Under certain circumstances, it can occur, however, that no match can be found at all or even the best match is only very moderate as compared to previously evaluated frames. This can be expressed qualitatively by an uncertainty factor, which is assigned to the result of the template matching algorithm for the respective frame.

A situation which is problematic for the evaluation occurs, for instance, when a player is wholly or partly concealed, e.g. by another player, by a doctor or physio or by an advertising board. In such a case, the template matching algorithm provides a correspondingly poor result, so that the continuously stored uncertainty factor rises significantly. If the uncertainty factor exceeds a previously defined uncertainty threshold, a correction algorithm is included in the position determination in connection with an error treatment procedure.

A first measure of the correction algorithm initially provides that a position forecast by the prediction is automatically assumed as the player position. For the succeeding frames, the assumption of forecast positions is continued, until the uncertainty factor again decreases significantly and falls below the uncertainty threshold. This is the case when the player is freely visible again, and he has not moved out of the dynamic search region meanwhile. However, this procedure is not maintained for any length of time, as the forecast of the prediction becomes inaccurate with constantly poor matching results and is subject to ever increasing errors.

Therefore, a second measure of the correction algorithm furthermore provides that after a certain time, or after a certain number of frames, the procedure is changed and the last "secured" position of the player, in which the uncertainty factor was below the uncertainty threshold, is adopted as the current player position. This is expedient, because it is fair to assume that the concealed player may not have moved at all. The meanwhile stored forecast positions are automatically replaced by the last secured position. The transition from the first to the second measure need not be effected abruptly. The correction algorithm also can provide a mixture of both measures with a gradual transition to the second measure.

However, even the correction algorithm cannot guarantee an error-free evaluation. Under particular circumstances, for instance when a player is concealed by another player of his own team, it can occasionally occur despite the use of the correction algorithm that the two players are mixed up in the course of the superposition. Since the same player model is used for both players, it cannot be excluded in principle that subsequent to the superposition in both cases the wrong player is further followed in the tracking process.

Therefore, beside the automatic correction algorithm it is also provided for in the error treatment procedure that the match observer 22 can make manual interventions. Within the scope of the process of tracking the individual players, an overlap of two players (a merging) always is detected by the computer, analyzed automatically and indicated to the match observer 22 by means of a video output. The match observer 22 now must check the result of the automatic merging analysis by either actively confirming the result (in the case of a correct player allocation) or by having the same corrected (in the case of an incorrect player allocation). In the case of a rectified mistake, the incorrect allocation then is automatically corrected also for the period between the exceeding of the uncertainty threshold (the detection of the merging) and the manual correction by the match observer 22, in that the positions recorded in this period are allocated to the correct player.

The determined position data of the players, which each relate to the positions in the frames, are smoothed in connection with a post-processing operation and transformed into coordinates of a three-dimensional reference system, preferably into world coordinates. Smoothing is effected by the method of the "moving average" in consideration of a number of frames corresponding to the frame rate of the cameras 10, 12, e.g. 25 frames when the rate is 25 frames per second. The coordinates are stored and can be supplied to separate evaluation algorithms for statistical purposes on a real-time basis (in the case of live transmissions) or upon completion of the entire recording.

The invention has been described on the example of the tracking of players during a football (soccer) match. The invention can of course also be used in other kinds of sports for tracking players, athletes or any items. In other fields outside sports, the invention can also be employed for tracking certain objects.

The invention claimed is:
1. A method for tracking an object in a sequence of video frames, characterized by the following steps:
  before performing a template matching algorithm;
    creating a model with characteristic features for the object to be tracked;
      wherein a first component of the model contains at least one geometric dimension being a geometric shape of the object; and
      wherein a second component of the model contains a color of the object;
    defining a region of interest, ROI, inside which the object should be tracked; and
  performing the template matching algorithm in individual frames of the sequence of video frames on the basis of the created model for determining a position of the object in the respective frame, the template matching algorithm consisting of moving the template over a search region of the respective frame, wherein the search region is determined by a dynamic prediction for the object and comparing the template with the search region pixel by pixel, the comparing using both the first component and the second component;
  characterized in that:
    in dependence on the result of the template matching algorithm, an uncertainty factor is assigned to the position of the object determined by the template matching algorithm;

a correction algorithm is included in the determination of the position of the object, when the uncertainty factor exceeds an uncertainty threshold; and as a first measure, the correction algorithm continues to automatically output a position forecast by the prediction as the current object position over a certain period, until the uncertainty factor falls below the uncertainty threshold.

2. The method according to claim 1, characterized in that the first component is determined on the basis of a background subtraction.

3. The method according to claim 1, characterized in that the first component is determined on the basis of a calibration with respect to another object with known position and known dimension.

4. The method according to claim 1, characterized in that the first component is determined on the basis of a manual annotation by an observer.

5. The method according to any of claims 2 to 4, characterized in that the first component is provided with a position-dependent correction function.

6. The method according to claim 1, characterized in that the second component is a color dependent on the first component.

7. The method according to any of claims 1 or 2 to 4, characterized in that when creating the model, object regions are defined, to which certain colors are allocated.

8. The method according to claim 7, characterized in that when performing the template matching algorithm, a weighting of the object regions is included.

9. The method according to claim 7, characterized in that before performing the template matching algorithm, wherein the ROI is further defined such that other objects are tracked inside thereof and further regions are defined inside thereof.

10. The method according to claim 1, characterized in that when determining the search region, the positions of the object in a specific number of previous frames are considered.

11. The method according to claim 1, characterized in that when determining the search region, a maximum reach of the object relative to its last position is determined.

12. The method according to claim 1, characterized in that as a second measure, the correction algorithm continues to output a position, which was determined as an object position before exceeding the uncertainty threshold, as the current object position, until the uncertainty factor falls below the uncertainty threshold again.

13. The method according to claim 1, characterized in that an observer manually intervenes to correct a false allocation of positions of said object.

14. The method according to claim 13, characterized in that an overlap of two objects is detected and analyzed automatically by a merging algorithm, whereupon the observer is given the opportunity to correct the result of the merging algorithm.

15. A method for tracking an object in a sequence of video frames, characterized by the following steps:

before performing a template matching algorithm;

creating a model with characteristic features for the object to be tracked;

wherein a first component of the model contains at least one geometric dimension being a geometric shape of the object; and wherein a second component of the model contains a color of the object;

defining a region of interest, ROI, inside which the object should be tracked; and performing the template matching algorithm in individual frames of the sequence of video frames on the basis of the created model for determining a position of the object in the respective frame, the template matching algorithm consisting of moving the template over a search region of the respective frame, wherein the search region is determined by a dynamic prediction for the object and comparing the template with the search region pixel by pixel, the comparing using both the first component and the second component;

characterized in that:

in dependence on the result of the template matching algorithm, an uncertainty factor is assigned to the position of the object determined by the template matching algorithm; and a correction algorithm is included in the determination of the position of the object, when the uncertainty factor exceeds an uncertainty threshold; and wherein after a manual intervention by an observer, the correction algorithm checks when the uncertainty factor has exceeded the uncertainty threshold and automatically corrects a false allocation also for the period between the exceeding of the uncertainty threshold and the manual intervention.

16. The method according to claim 1, characterized in that the template matching algorithm defines colors according to a HSV color model.

17. The method according to claim 1, characterized in that each template matching algorithm is performed on a real-time basis and the positions of the object determined are stored on a real-time basis.

18. The method according to claim 1, characterized in that successively determined position data of the object are smoothed.

19. The method according to claim 1, characterized in that the determined position data of the object are transformed into coordinates of a three-dimensional reference system, preferably into world coordinates.

20. The method according to claim 1, characterized in that in the sequence of video frames a plurality of objects are tracked at the same time.

21. An apparatus arrangement for performing the method according to any one of claims 1, 6, 10, 11, or 2-4 or 12-20 inclusive, comprising at least one video camera, at least one monitor, one computer and one input device for an observer.

22. The apparatus arrangement according to claim 21, characterized in that two video cameras are provided, which are arranged such that they detect two different regions of a ROI within which the object is to be tracked.

23. The method according to claim 1, characterized in that after a manual intervention by an observer, the correction algorithm checks when the uncertainty factor has exceeded the uncertainty threshold and automatically corrects a false allocation also for the period between the exceeding of the uncertainty threshold and the manual intervention.

* * * * *

UNITED STATES PATENT AND TRADEMARK OFFICE
CERTIFICATE OF CORRECTION

PATENT NO. : 8,542,874 B2  
APPLICATION NO. : 12/668650  
DATED : September 24, 2013  
INVENTOR(S) : Hoeflinger Page 1 of 1

It is certified that error appears in the above-identified patent and that said Letters Patent is hereby corrected as shown below:

In the Specification

Column 1  
Line 25, change "and be evaluated" to --and can be evaluated--

Column 2  
Line 18, change "detail on the example" to --detail using the example--  
Line 31, change "respective camera 10,12" to --respective cameras 10,12--

Column 3  
Line 16, change "such model" to --such models--  
Line 48, change "appears the larger, the closer he is" to --appears larger the closer he is--  
Line 51, change "from a database." to --from a database is given.--  
Line 65, change "be effected" to --be affected--

Column 6  
Line 33, change "on the example" to --using the example--

Signed and Sealed this  
Twentieth Day of May, 2014

Michelle K. Lee  
*Deputy Director of the United States Patent and Trademark Office*